United States Patent
Sutherland et al.

(10) Patent No.: US 7,206,958 B1
(45) Date of Patent: Apr. 17, 2007

(54) DETERMINING CYCLE ADJUSTMENTS FOR STATIC TIMING ANALYSIS OF MULTIFREQUENCY CIRCUITS

(75) Inventors: Jeannette N. Sutherland, Cedar Park, TX (US); Robert E. Mains, Morgan Hill, CA (US); Matthew J. Amatangelo, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 406 days.

(21) Appl. No.: 10/690,059

(22) Filed: Oct. 21, 2003

(51) Int. Cl.
*G06F 1/04* (2006.01)
(52) U.S. Cl. ............... 713/500; 703/19; 716/6
(58) Field of Classification Search ............... 703/19; 713/500; 716/6
See application file for complete search history.

(56) References Cited

U.S. PATENT DOCUMENTS

| | | | |
|---|---|---|---|
| 5,355,321 A | * | 10/1994 | Grodstein et al. ............ 716/6 |
| 5,771,375 A | | 6/1998 | Mains |
| 6,115,827 A | * | 9/2000 | Nadeau-Dostie et al. ... 713/503 |
| 2003/0192020 A1 | * | 10/2003 | Collins ........................ 716/6 |

* cited by examiner

*Primary Examiner*—Chun Cao
*Assistant Examiner*—Albert Wang
(74) *Attorney, Agent, or Firm*—Dorsey & Whitney LLP (57) ABSTRACT

Given two synchronous clocks which transact data from a transmitter element to a receiver element which are analyzed by static timing, the interval between the transmitting data launch clock edge and the receiving capture clock edge is adjusted from the clock waveforms provided in order to represent the worst case slack situation between these two clocks over time. The amount of this adjustment is determined without unrolling (enumerating) all possible launch/capture pairs for these clocks. The greatest common divisor (GCD) of a transmit clock frequency and a receive clock frequency is determined. An effective phase shift is determined by performing a MOD operation between the GCD and an offset of the transmitter and receiver clocks. An algorithm uses the GCD and effective phase shift to determine a launch/capture interval that corresponds to a critical slack condition.

39 Claims, 6 Drawing Sheets

DETERMINING CYCLE ADJUSTMENTS FOR STATIC TIMING ANALYSIS OF MULTIFREQUENCY CIRCUITS

FIELD OF THE INVENTION

The present invention relates generally to circuit timing analysis, and more particularly to determining cycle adjustments for static timing analysis of multifrequency circuits.

BACKGROUND

To ensure the proper operation of digital circuits, data sent from a transmitting element to a receiving element need to arrive at the receiving element at the proper time. If the data arrives too early, it may erroneously overwrite other data being held in the receiving element. If the data arrives too early, it may prevent the previous data value from being captured by the receiving element. If the data arrives too late, it will not be captured by the receiving circuit element. In effect, for synchronous circuits, data must arrive at a circuit element during a window of time beginning after the receiving element has finished capturing the previous data value and ending at the last point the receiving element can capture the data. The beginning and end of this window are defined, at least in part, by a circuit element's setup time and hold time, respectively.

Associated with setup time and hold time, are setup slack and hold slack. Setup slack is the amount of time data arrives at the receiving element before the receiving element requires the data to arrive (i.e. the end of the window); and hold slack is the amount of time data arrives at a receiving element after the receiving element is required to be ready to receive the data (i.e. the beginning of the window). These concepts are expressed mathematically in the following equations:

$$Slack_S = RT - AT; \text{ and}$$

$$Slack_H = AT - RT;$$

where $Slack_S$ is setup slack; $Slack_H$ is hold slack; AT is the arrival time of the data at the receiving element; and RT is the required data arrival time, i.e. the end of the window for setup slack, and the beginning of the window for hold slack.

Since both setup and hold slack are so important to circuit functionality, it is common to determine a worst case slack for both the setup and hold circumstances. Worst case setup slack is based on the earliest setup required time, which corresponds to the earliest time the capturing edge may occur. This setup required time answers the question of how much delay a data path can endure at a particular clock frequency. Worst case hold slack is based on the latest hold required time, which corresponds to the latest time the previous capturing edge may occur. This hold required time reveals how much time a receiving element needs to ready itself to receive the data. In either case, if the slack is negative the clock and data arrival events will not occur in the proper order.

Both worst case setup slack and worst case hold slack can be determined based on a static timing analysis of the circuit. Static timing analysis considers only events that occur within a single period of the system clock. For example, if the system clock operates at a frequency of 1 GHz, then static timing analysis considers only events that occur within any 1 nanosecond period. In effect, static timing analysis looks at the end of each data path, to compare the arrival of the data signal to the arrival of the receive clock.

In performing the static timing analysis, two clock edges are used; one simulates the arrival of the data, and the other simulates the triggering edge of the receive clock. To make sure the circuit element being tested will function properly, the two simulated signal edges are adjusted to simulate the most difficult timing requirements the circuit might have to endure. Note that the most difficult timing requirements occur under worst case slack situations. Consequently, the relationship of the triggering edge of the data and the triggering edge of the receiver clock are set to coincide with their relationship during a worst case slack scenario.

In systems using a single master clock to trigger both the data transmitting element and the data receiving element, determining the timing relationship between the data signal (which has the same timing as the data clock) and the receive clock involves comparing two triggering edges of the same clock. Since both triggering edges are part of the same clock signal, determining the relationship between the data signal and the receive clock is relatively straight forward. In multifrequency clock systems, however, determining the relationship between the data signal and the receive clock that corresponds to worst case slack can be more difficult.

Figure 1:
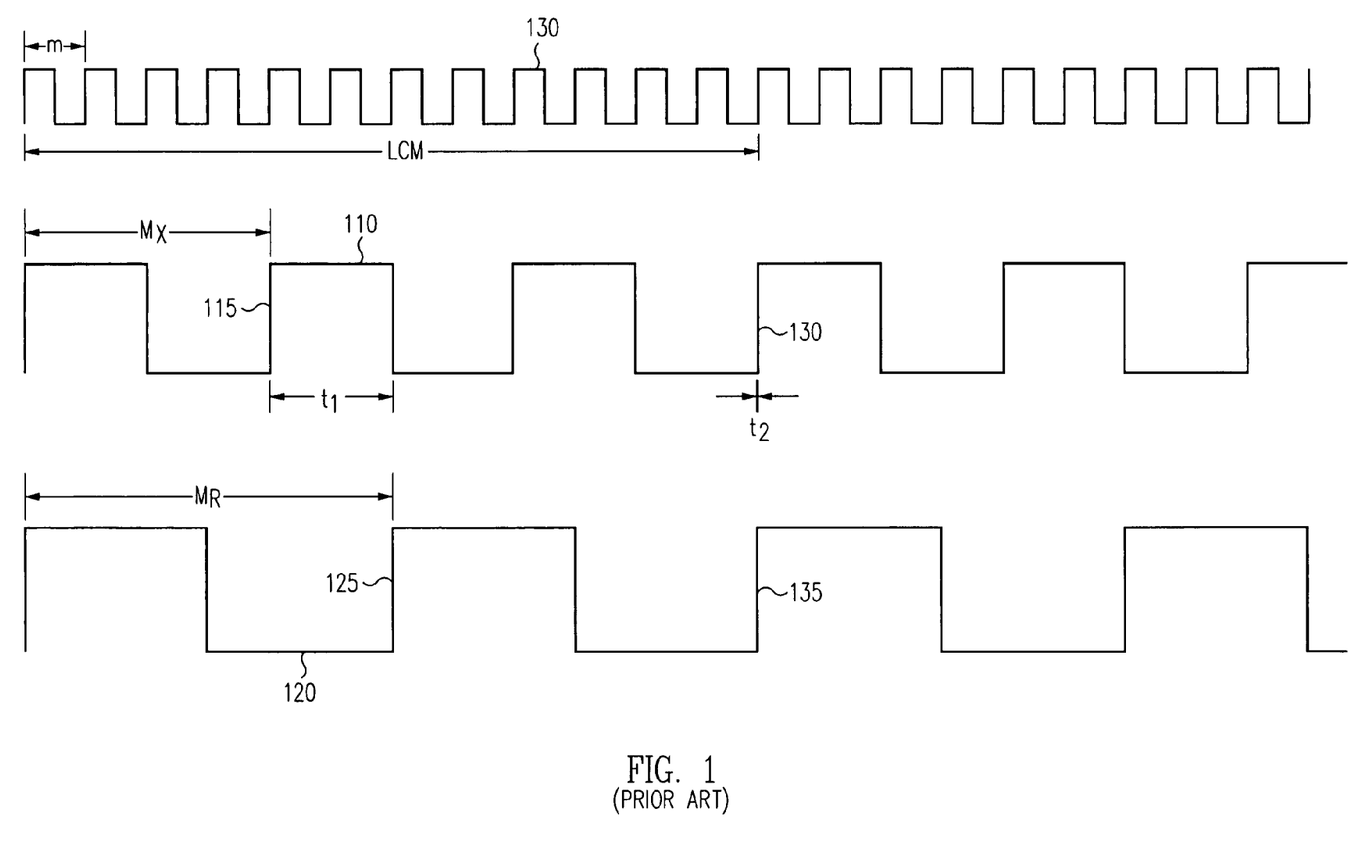
FIG. 1 (Prior Art) is a timing diagram illustrating unrolling receive and transmit clocks relative to a master clock.

Multifrequency clock systems derive their transmit and receive clocks from a single master clock, but for a particular pair of transmit-receive elements, the transmit clock (and hence the data transmitted using the transmit clock) may have a different frequency than the receive clock. This frequency difference can make determining the relationship between the triggering edges of the data signal and the receive clock more difficult, since the timing relationship between the data signal and the receive clock may vary. FIG. 1, which is discussed in greater detail subsequently, illustrates one case in which the timing relationship between a data clock 110 and a receive clock 120 varies.

When performing static timing analysis on multifrequency circuits, designers often employ one of two methods to determine the timing relationship between the data signal and the receive clock. One method is to simply force any receiving elements to be ready to receive data within a single master clock cycle. While this method generally ensures that circuit timing requirements will not be violated, it tends to be overly pessimistic and may require tradeoffs in speed or some other performance factor.

The second method commonly used is illustrated in prior art FIG. 1. The transmit clock 110 and receive clock 120 are unrolled, that is, the edges of each clock are enumerated. The number of clock cycles unrolled corresponds to the number of master clock cycles required to define the least common multiple (LCM) of the two clocks relative to the master clock. For example, consider the case of a master clock 130 having a period m, a transmit clock 110 having a period $M_X$ equal to 4m, and a receive clock 120 having a period $M_R$ equal to 6m. The LCM of the transmit clock 110 and the receive clock 120 is 12m. Therefore, the clock signals are unrolled to the equivalent of 12 cycles of the master clock 130.

There is, within the unrolled clock cycles, at least one transmit edge 115 that transitions closest in time to the subsequent receive clock edge 125, and one transmit edge 130 that transitions closest in time to the preceding or coincident receive clock edge 135. For the signals shown in FIG. 1, the time $t_1$ (2m) between clock edges 115 and 125 corresponds to the worst case setup slack. The time $t_2$ (0m) between clock edges 130 and 135 corresponds to the worst case hold slack. It is unnecessary to unroll more than the number of clock cycles equal to the LCM (although more are shown), because the relationship between the transmit clock 110 and receive clock 120 starts repeating. For example, the relationship between the clock signals at ½ LCM is the same as the relationship at 1½ LCM, 2½ LCM, and so on.

Once the clocks are unrolled, as illustrated in FIG. 1, the triggering edges of the transmit and receive clocks (assumed for purposes of example to be the rising edges) are compared to determine which rising edge of the receive clock occurs closest to an immediately preceding rising edge of the transmit clock (to determine setup slack). In this example, the second rising edge 125 of the receive clock 120 occurs 2 master clock cycles after the second rising edge 115 of the transmit clock 110. Since no other rising edge of the receive clock 120 occurs closer to any immediately preceding rising edge of the transmit clock 110, it can be safely assumed that under worst case setup slack conditions, the event triggering the receiver (i.e. a rising edge of the receive clock) will occur 2m periods after the transmission triggering event (i.e. a rising edge of the data clock).

A similar procedure can be performed to determine the timing relationship between the data signal and the receive clock under worst case hold slack conditions. Since there is no time difference between rising edge 130 of transmit clock 110 and the closest immediately preceding rising edge of receive clock 120, under worst case hold slack conditions the rising edge of the data signal will occur at the time the receive element is clocked.

Unrolling the clocks to determine the timing relationship between the data signal and the receiver clock signal under worst case slack conditions avoids being overly pessimistic, but unrolling the clocks can be computationally intensive.

SUMMARY

In at least one embodiment, the triggering edge of one or more test clocks used in static timing analysis of a multifrequency system is shifted to simulate a worst case slack situation, allowing designers to verify the timing of their designs. The amount by which the test clock edge is shifted (sometimes referred to as a cycle adjustment) is determined without unrolling (enumerating) triggering events of a transmit clock and a receive clock. In one implementation, the greatest common divisor (GCD) of a transmit clock frequency and a receive clock frequency is determined. The GCD is the largest multiple of a master clock's frequency by which the frequencies of both the transmit and receive clocks can be divided without a remainder. An effective phase shift is then determined by performing a MOD operation between the GCD and an offset of the transmit clock and the receive clock. The amount by which the test clock edge is shifted can be determined from the effective phase shift.

In one embodiment, when determining the effective phase shift for purposes of setup slack computation, if the effective phase shift is zero, the transition of the clock test edges are separated by a number of master clock cycles equal to the GCD. If the effective phase shift is not equal to zero, then the worst case setup slack timing relationship of the transmit clock and the receive clock is simulated by setting the time between the clock edge transitions equal to the effective phase shift.

The invention described herein can be implemented in many forms, including a computer readable medium embodying a program of executable instructions to be executed by a computer, and a computer readable medium product encoding an integrated circuit design.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED
EMBODIMENT(S)

Figure 2:
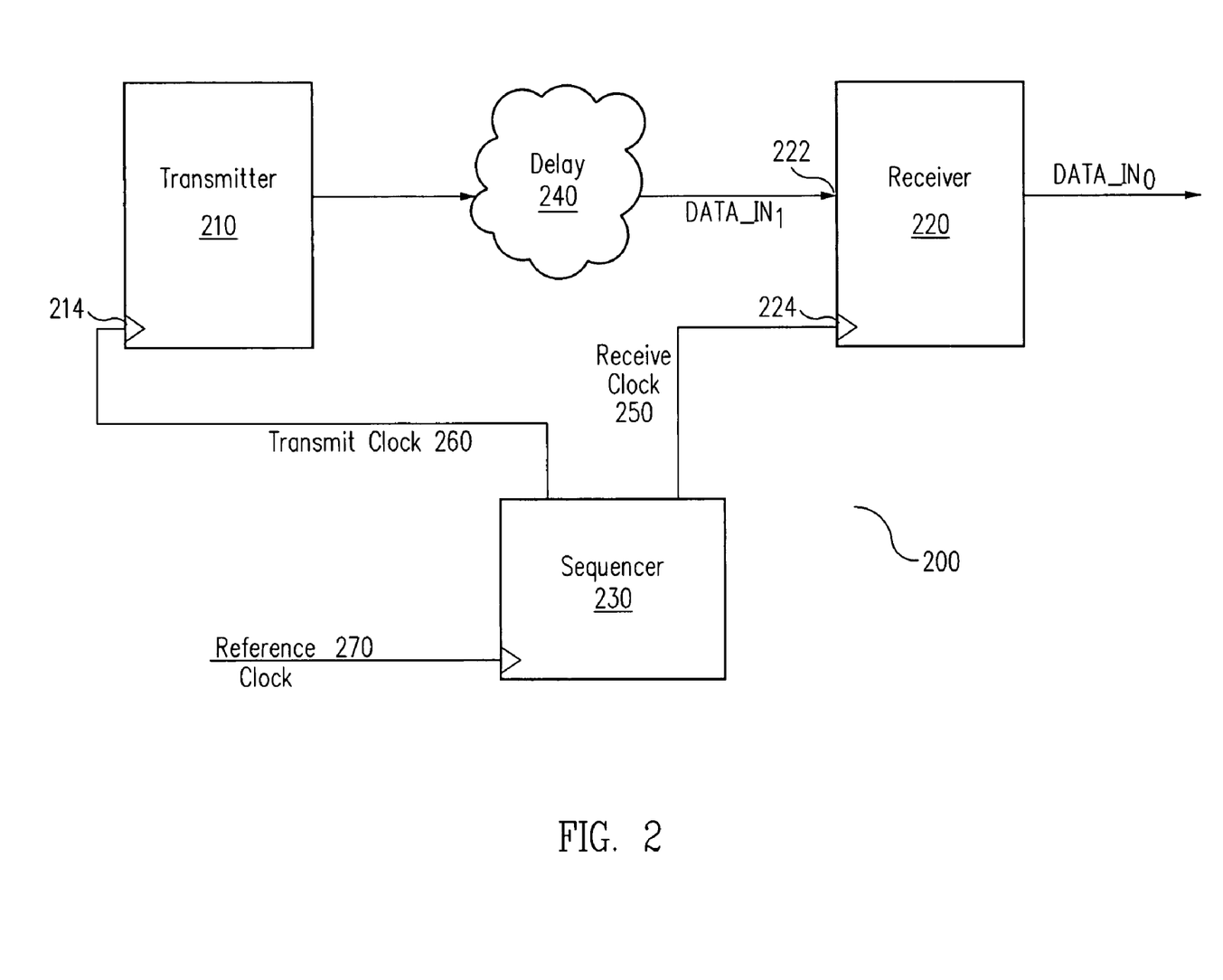
FIG. 2 is a block diagram illustrating a multifrequency clock circuit for which slack is to be determined according to an embodiment of the present invention.

Referring first to FIG. 2, a block diagram illustrating a circuit employing a multifrequency clock is illustrated, and designated generally circuit 200. Circuit 200 includes transmitter 210, receiver 220, sequencer 230, and delay 240. Transmitter 210, receiver 220 and delay 240 are, in at least one embodiment, circuit element models configured to simulate circuit elements of a circuit design being tested. For example, transmitter 210 and receiver 220 may model flip-flops, memory cells, buffers, registers, or any number or combination of these or other circuit elements. In FIG. 2, both transmitter 210 and receiver 220 are models of edge triggered flip-flops configured to be triggered by the rising edges of clock signals 260 and 250, respectively. It will be appreciated, however, that either or both transmitter 210 and receiver 220 may use falling edges as triggers in appropriate design configurations.

Delay 240 is a model of the delay time exhibited by the signal path between the circuit elements modeled by transmitter 210 and receiver 220. That is to say, in the actual circuit design being tested, there may be any number of circuit elements interposed between transmitter 210 and receiver 220. Delay 240 may represent the delay of a worst case timing path (e.g. for most setup timing tests), a best case timing path (e.g. for most hold timing tests), a most probable timing path, or another type of timing delay. Delay 240 can be determined using any of numerous methods of delay modeling currently available.

In at least one embodiment, the static timing test of circuit 200 is a test of the setup timing of receiver 220, and relates to the arrival of DATA_IN at data input 222 of receiver 220 in relation to the arrival of receive clock 250 at clock input 224 of receiver 220. When receive clock 250 arrives at clock input 224, the data value $DATA\_IN_1$ will be stored into receiver 220, and will also be propagated downstream to other circuit elements. Prior to receive clock 250 arriving at clock input 224, the previous data value $DATA\_IN_0$ is visible to downstream elements. For receiver 220 to store DATA_IN$_1$ in response to receive clock 250, DATA_IN$_1$ must be present at data input 222 when a triggering edge of transmit clock 260 arrives at clock input 224. To verify that DATA_IN$_1$, transmitted by transmitter 210 will arrive at data input 222 before a rising edge of receive clock 250 arrives at clock input 224 under all possible conditions, a static timing analysis will consider the relationship between DATA_IN$_1$ and receive clock 250 under worst case setup slack conditions.

For example, consider the case where data signal DATA_IN$_1$ arrives 10 microseconds before receive clock 250, independent of which clock cycle of receive clock 250 is considered. In such a case, any clock cycle can be chosen for static timing analysis. If, however, DATA_IN$_1$ arrives 10 microseconds before receive clock 250 during one clock cycle, and only 3 microseconds before receive clock 250 during another clock cycle, the clock cycle with a 3 microsecond difference in arrival times should be chosen for testing to ensure that receiver 220 can meet the most stringent timing requirements. Similar procedures are performed when performing hold tests, except that the test is concerned not with whether DATA_IN$_1$ arrives soon enough, but rather concerned that DATA_IN$_1$ arrives late enough.

Sequencer 230 is used to produce both clock signals, 250 and 260. In the circuit design being tested, the clock signal used to control transmitter 210 has a different frequency than the clock controlling receiver 220, but each of the frequencies is related to a common reference frequency. Thus, the circuit is said to employ a multifrequency clock. The two clock frequencies in the circuit being tested are usually derived from a common clock to ensure that the frequencies are synchronous. The circuit illustrated in FIG. 2 provides a reference clock 270 to sequencer 230, which uses the reference clock 270 to generate clock signals 250 and 260.

Figure 3:
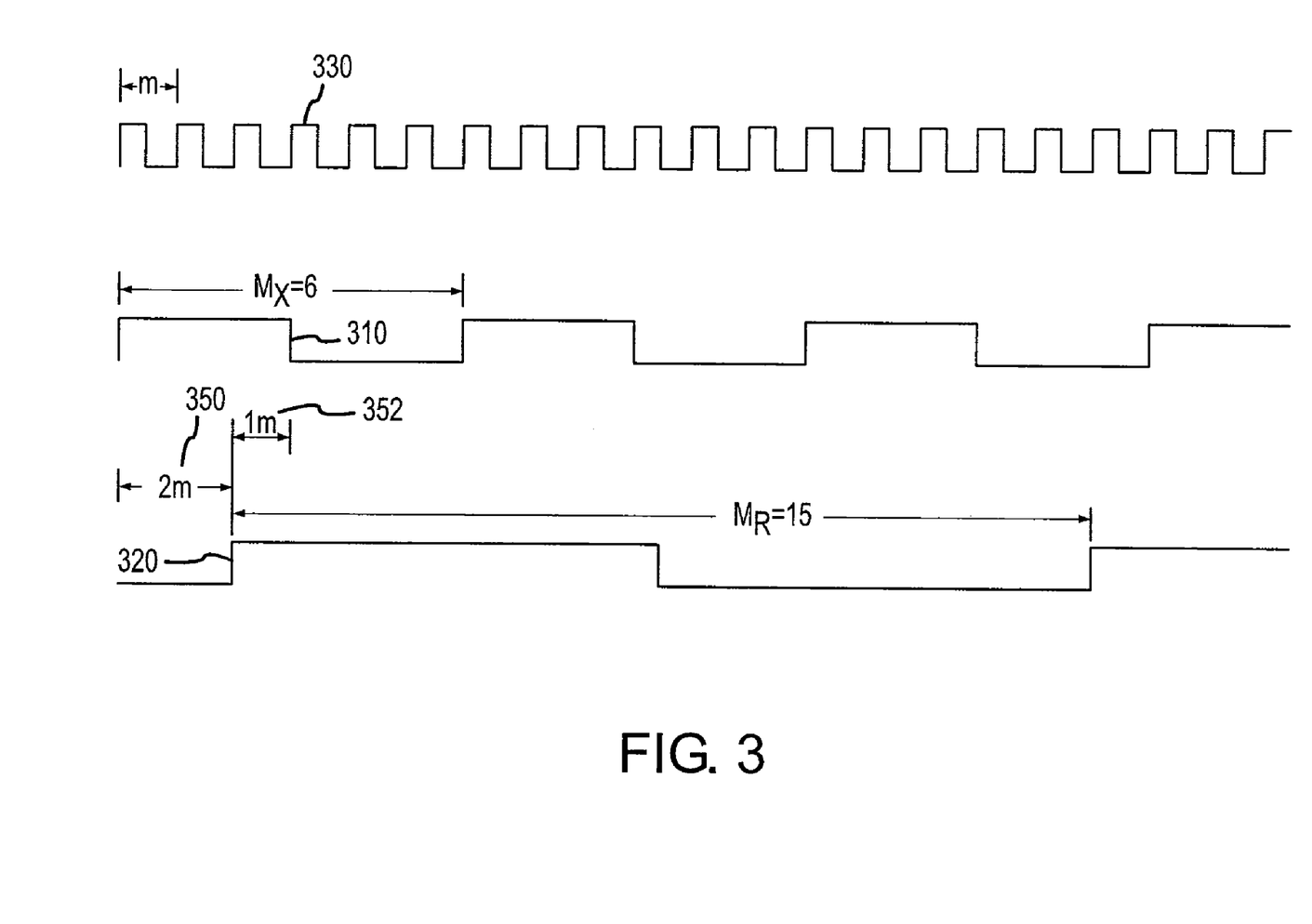
FIG. 3 is a timing diagram illustrating an offset between the transmit clock and the receive clock according to an embodiment of the present invention.

Referring next to FIG. 3, a timing diagram illustrating the relationship between various clock signals during a single receiver clock cycle is presented according to an embodiment of the present invention. Reference clock 330, which may be, for example, a master clock from which other clock signals are derived, has a period m. Clock 310, which is used as a transmit clock, has a period $M_X$. Clock 320, which is used as a receive clock, has a period $M_R$. Note that the period $M_R$ of clock 320 is 15 times greater than the period m of clock 330, and that the period of clock 310 is 6 times greater than the period m of clock 330. In terms of the period m of reference clock 330, therefore, the period $M_R$ of clock 320 is simply 15, and the period $M_X$ of clock 310 is 6.

In at least one embodiment, the present invention takes into account an offset 350 between clock 310 and 320 when determining cycle adjustments to simulate a worst case slack scenario. Offset 350 is a fixed offset that does not vary between cycles of clock 320. Note, that for the illustrated clock signals, the worst case setup slack occurs when a triggering edge of clock 320 occurs 2m clock cycles after the immediately preceding triggering edge of clock 310. Also not that the worst case hold slack occurs when the triggering edge of clock 320 occurs 1m clock cycles before the immediately subsequent triggering edge of clock 310.

Figure 4:
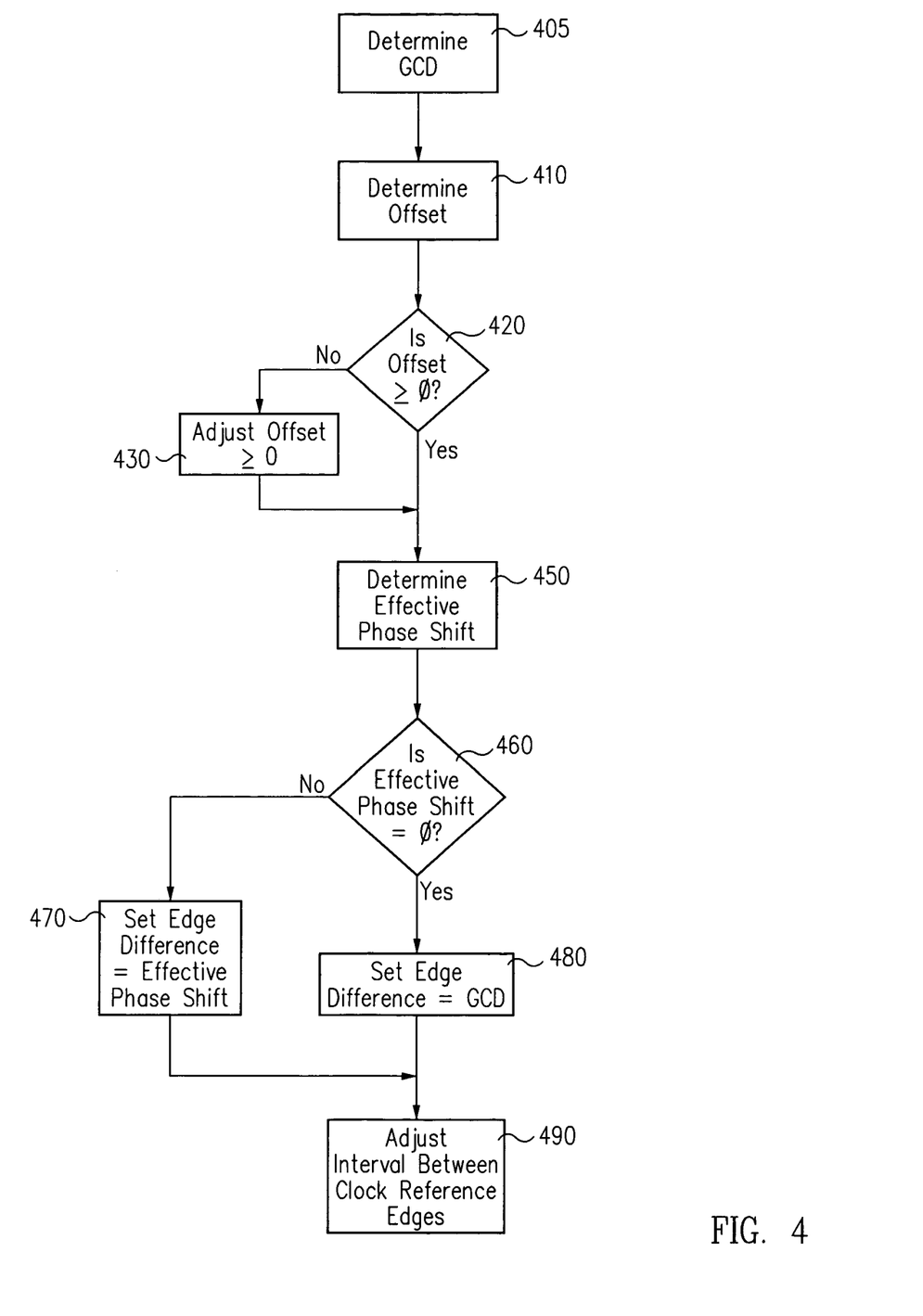
FIG. 4 is a flow chart illustrating a method for use in determining cycle adjustments for worst case setup slack according to one embodiment of the present invention.

Referring next to FIG. 4, a method of determining cycle adjustments to account for worst case setup slack in static timing analysis will be considered. In static timing analysis, a transmit clock is used as a proxy for a data signal, since the data signal edges correspond to edges of the data clock. Any comparisons, computations, etc. referred to in the steps below are performed between a transmit clock and a receive clock having different frequencies, with both clock frequencies related to a common reference/master clock frequency. Computational values in the examples are stated in terms of the reference clock's period.

The method begins at step 405, in which the greatest common divisor (GCD) of the two clock signals is computed. Intuitively, for example, if a transmit clock has a period of 6, and a receive clock has a period of 15, then the GCD is 3 (since the largest number by which both 6 and 15 are divisible is 3). In implementing the various embodiments of the present invention, the GCD may be calculated by various techniques familiar to those skilled in the art. In one embodiment, the GCD is computed by executing a sequence of processor instructions corresponding to the following pseudocode:

```
While (($remainder !=0))
  Let remainder=$A % $B
  If (($remainder !=0)) then
    Let gcd=$remainder
  Else
    Let gcd=$B
  Endif
  Let A=$B
  Let B=$gcd
Done
```

Using the clock signals illustrated in FIG. 3 as an example, assume that A=15 (the period of the receive clock 320) and B=6 (the period of the transmit clock 310). Remainder will be 3 (the result of 15 MOD 6). Since the remainder is not zero, gcd is assigned the value of 3. A is set to 6, B is set to 3, and the process loops back to the beginning of the loop. Now remainder equals 6 MOD 3, which is zero, leaving gcd=3.

Once the GCD has been determined in step 405, the method proceeds to step 410 where it determines an offset between the transmit clock and the receive clock. An example of an offset is illustrated in FIG. 3. A circuit description, such as a netlist, used for static timing analysis will normally include a description of the clocks used to control various circuit elements. This description may contain an offset value, the offset can be determined from the circuit description. Otherwise, the clocks can be simulated, and an offset determined from the simulation. This offset is, in at least one embodiment, the result of using either a rising or falling edge to trigger data transmission, and using an opposite edge of the receive clock to trigger the data receiving element.

Step 420 tests to see if the offset determined in step 410 is negative, meaning that the initial triggering edge of the receive clock rises before the initial rising edge of the transmit clock. If the offset is negative, then step 430 is performed to determine an equivalent non-negative offset. An equivalent non-negative offset can be determined by adding an integral positive number times the GCD. For example, if the GCD of the transmit and receive clock periods is 13, a negative offset of 3 will yield an equivalent positive offset of 10. The conversion to a non-negative offset is performed, if at all, primarily to minimize the computational complexity of later steps. In at least one embodiment, no conversion to a non-negative offset is performed.

Once step 430 has determined a non-negative offset, the method proceeds to step 450. In step 450, the effective phase shift of the receive clock relative to the transmit clock is determined. Note that in determining the effective phase shift as taught herein, it is not necessary to unroll the transmit and receive clock signals. The effective phase shift can be determined according to the following formula:

MOD (Offset, GCD(Mx, Mr)), where Offset is the offset previously discussed in steps 410–430, and GCD(Mx, Mr) is the GCD calculated in step 440. As an example of calculating the effective phase shift, assume an offset of 2, a transmit clock period of 6, and a receive clock period of 15, as illustrated in FIG. 3. Recall that the GCD in this case is 3, so the formula becomes MOD(2, 3)=2. Consequently, the effective phase shift for the clock signals illustrated in FIG. 3 is 2.

Recall from the earlier discussion that a non-negative offset was determined primarily to aid in subsequent calculations. The MOD function is one calculation that may be facilitated by using a non-negative offset. Because the MOD function for negative numbers is defined differently in different programming languages, different programming languages and or software applications may return different values when the MOD of negative numbers is taken. Therefore, using a non-negative offset value may prove advantageous by providing cross-platform consistency, and by eliminating the need to verify the particular implementation of the MOD function for particular software applications and/or programming languages.

From step 450, the method proceeds to step 460, which determines whether the effective phase shift is zero. If the effective phase shift is zero, then step 480 sets the launch to capture interval (or edge difference) corresponding to the worst case setup slack equal to the GCD value determined in step 440. If the effective phase shift is not zero, then step 470 sets the edge difference corresponding to the worst case setup slack equal to the effective phase shift. Continuing with the previous example, since the effective phase shift is not zero, the method executes step 470, and the edge difference is set equal to 2, the effective phase shift determined in step 450.

Also consider the following example, using clock signals with the same periods, $M_X=6$ and $M_R=15$, as in the previous examples, but with an offset of 12, instead of 2. Step 410 would return a value of 12, the value of the new offset. Since the offset is non-negative, step 430 does not make any adjustments. Because the transmit and receive clocks have the same periods as in the above examples, the GCD returned by step 440 is still 3 (GCD of 6 and 15 equals 3). In this example, however, the effective phase shift determined in step 450 is zero (MOD(12, 3)=0). Since the effective phase shift is zero, the method executes step 480, and the edge difference is set equal to the GCD, which is 3.

Once the edge difference corresponding to worst case setup slack is determined in either step 470 or step 480, the method proceeds to step 490, in which the interval between the test clocks is adjusted by an amount equal to the edge difference to account for worst case setup slack in the static timing analysis. For example, assume that only the leading edges of the transmit clock and the receive clock are needed for purposes of a particular static timing analysis. A static timing program, such as those commonly known in the art, can be used to generate the leading edges of both the transmit clock and the receive clock for a single cycle. Typically, the static timing program will generate the leading edges of both clocks from a single reference clock. Since static timing analysis tools and techniques are well known in the art, clarity suggests that we not belabor the operation of any particular tools or techniques. Nonetheless, based on the description herein, persons of ordinary skill in the art will appreciate a wide variety of exploitations of the invented techniques including in combination with any of a variety of commercially available static timing analysis tools and test environments.

To account for worst case slack during a static timing analysis test, the static timing analysis program needs to appropriately adjust the interval between the leading edges of the transmit and receive clocks that it generates. According to one embodiment of the present invention, the static timing analysis program shifts the leading edge of the receiver to occur earlier, as needed, to simulate the worst case setup slack. Other suitable methods of adjusting the interval between the leading edges of the transmit and receive clocks may also be employed. For example, instead of shifting the receiver clock edge to be earlier, the leading edge of the transmit clock may be delayed.

Figure 5:
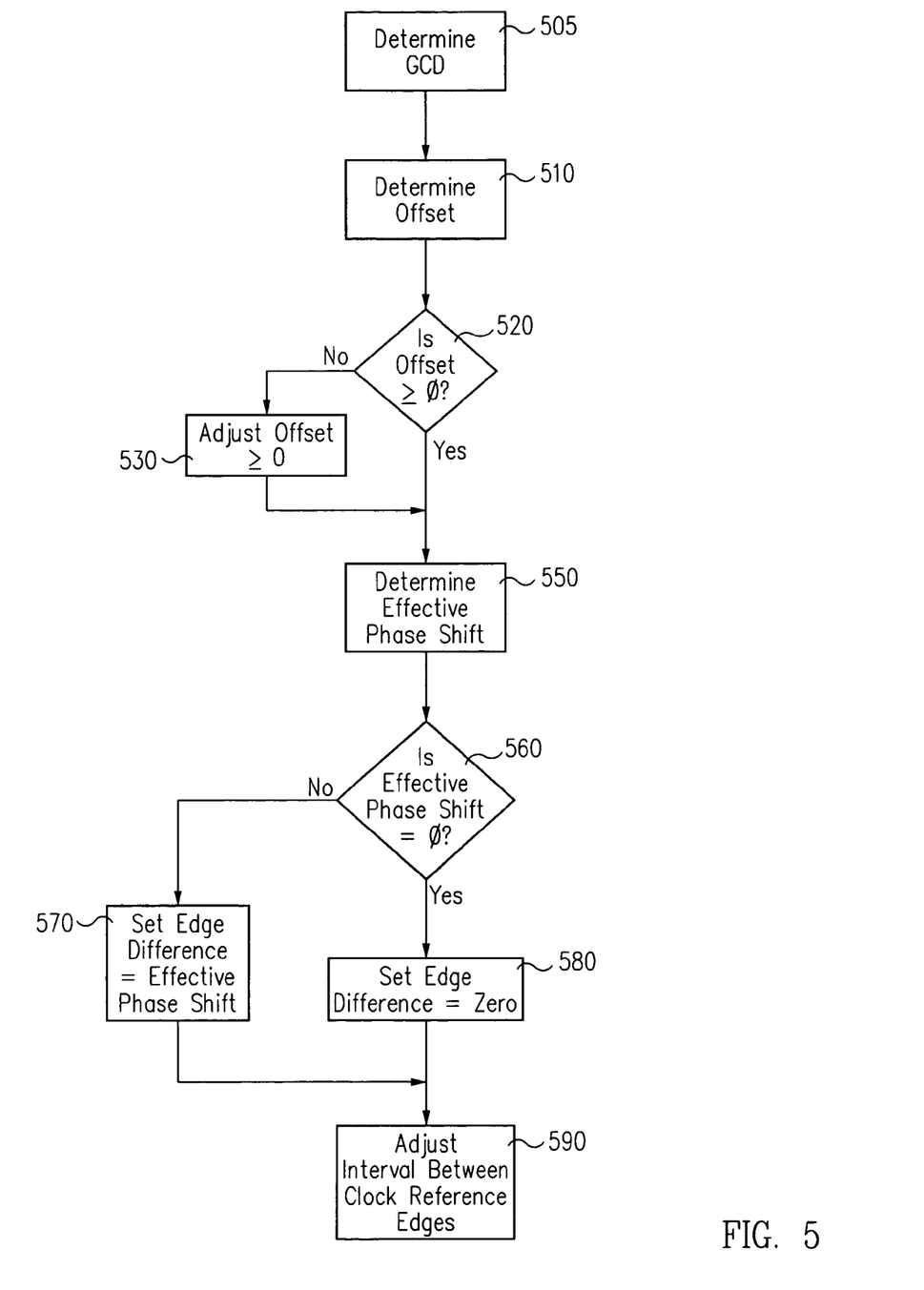
FIG. 5 is a flow chart illustrating a method for use in determining cycle adjustments for worst case hold slack according to one embodiment of the present invention.

Referring next to FIG. 5, a method of determining cycle adjustments to account for worst case hold slack in static timing analysis is discussed. The same steps that are illustrated in FIG. 4 are illustrated in FIG. 5, with the exception of step 580. In determining the edge difference for worst case hold slack, the method begins at block 505, where the GCD is computed as described with reference to FIG. 4. The method then proceeds to block 510, in which an offset is determined. Hold timing analysis is concerned with the amount of time by which a triggering edge of the transmit clock leads a trigger edge of the previous receive clock (exactly the opposite concern of setup timing analysis). As a result, the offset determined in step 510 is based on subtracting the time of the triggering edge of the receive clock from the time of the triggering edge of the transmit clock, the opposite of what is done for setup timing analysis.

Block 520 and 530 determine if the offset is negative, and adjust the offset to be non-negative as previously discussed with reference to FIG. 4. The method proceeds to blocks 550 where the effective phase shift is computed, also as described with reference to FIG. 4. If block 560 determines that the effective phase shift is zero, however, the method discussed in FIG. 5 diverges from the method illustrated in FIG. 4. While a zero edge difference is not valid when considering setup timing, a zero edge difference is perfectly valid when dealing with hold timing. Therefore, if block 560 determines that the effective phase shift is zero, block 580 sets the edge difference to zero. If the effective phase shift is not zero, step 570 sets the edge difference equal to the phase shift.

Another difference between the method of FIG. 5 and the method of FIG. 4 is that when block 590 adjusts the interval between the reference clock edges, the resulting triggering edge of the transmit clock will lead the triggering edge of the previous receive clock. In at least one embodiment, the triggering edge of the receive clock is delayed so that it precedes the transmit clock by an amount equal to the edge difference. It should be appreciated, however, that triggering edges of either or both the transmit clock or the receive clock can be shifted as needed to obtain the desired timing relationship.

The methods illustrated in FIGS. 2–5 can be implemented as a program of instructions to be executed using a data processor, and encoded in a computer readable medium. For example, each of the steps shown in FIGS. 4 and 5 may be implemented as software executable on a computer (e.g. as a subroutine, a stand alone program, or the like). In at least one embodiment, commercially available, off-the shelf, static timing analysis tools, such as Pathmill, Dynacore, and the like, are configured using macros, plug in modules, additional subroutines, or otherwise as appropriate to a particular exploitation or vendor configuration, to determine the edge differences that correspond to worst case slack using the teachings set forth herein.

In at least one embodiment, additional steps (not illustrated) are performed to generate a circuit design, and then to encode that circuit design onto a computer readable medium product. Various suitable methods can be used to generate timing models using the cycle adjustments determined as disclosed herein. Those timing models are in turn are used to develop and/or verify circuit designs, using methods and tools known to those skilled in the art.

Various methods of encoding information onto a computer readable medium are also well known. The computer readable medium onto which the circuit design or the program of instructions mentioned earlier is encoded includes, but is not limited to, storage media, for example, random access memories, read only memories, magnetically encodable tapes and disks, optically encodable tapes and disks, and communications media, for example, propagated signals such as those used in wireless networks, and the like. Such encodings of a particular circuit design may be transmitted and/or conveyed to an appropriate semiconductor fabrication facility, read using an appropriate reader device, and employed in the definition of an appropriate process, masks, etc. for fabrication of the designed circuit.

Figure 6:
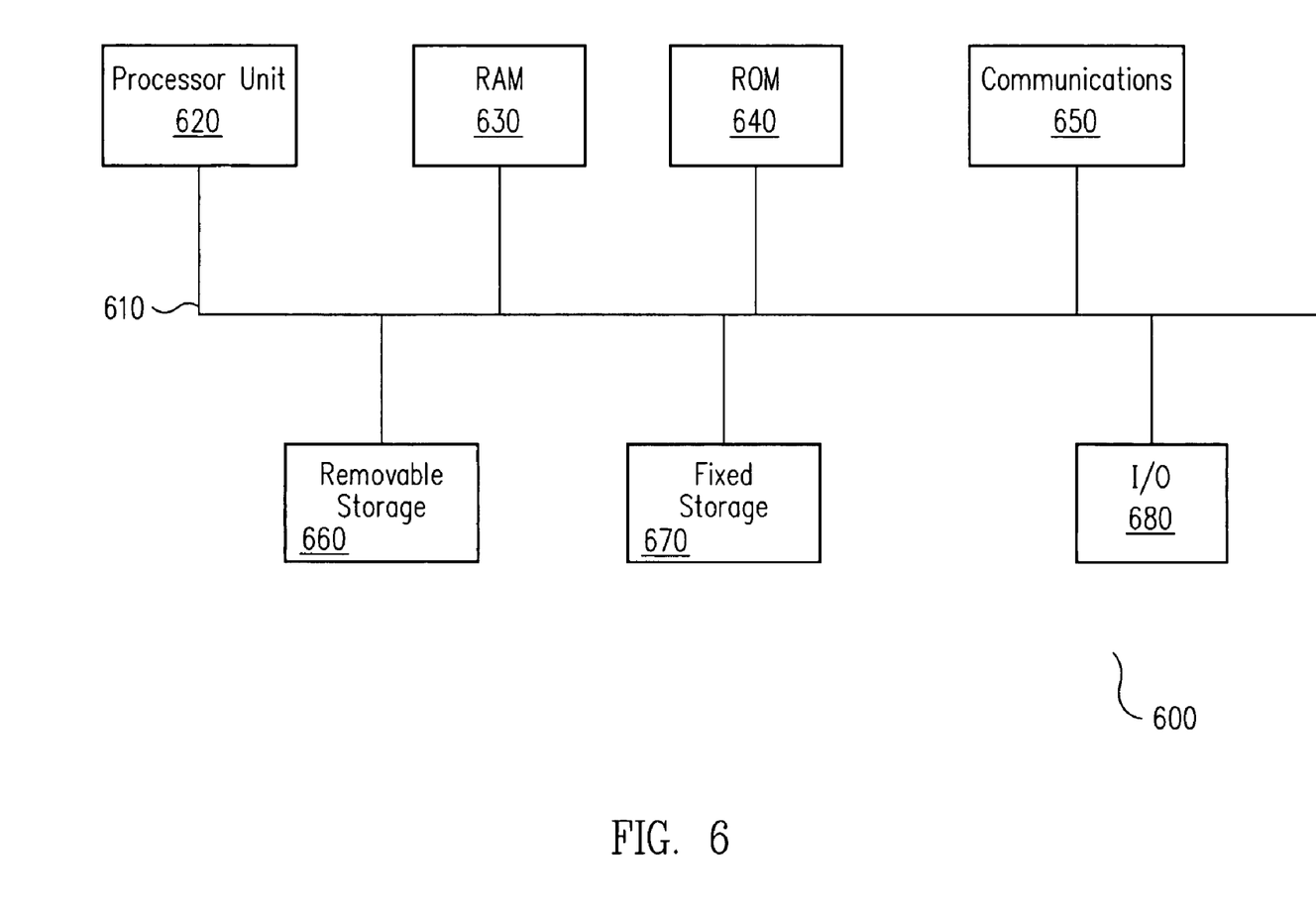
FIG. 6 is a block diagram of a data processor suitable for reading and/or executing a computer readable medium encoded with an integrated circuit design or a program of instructions according to an embodiment of the present invention.

The data processor 600 illustrated in FIG. 6 includes a number of devices connected to a common system bus 610. Processor unit 620, commonly referred to as central processing units (CPU), includes one or more devices that obtain information to be processed via system bus 610. After obtaining the information to be processed, processor unit 620 processes the information and outputs results to one of the other devices connected to system bus 610. RAM 630 and ROM 640 store programs and/or data for execution by processor unit 620. Removable storage 660 may include storage devices having removable media, such as floppy disks, compact disks, tape drives, memory sticks, and the like. Fixed storage 670 includes such devices as hard disk drives and the like that do not have removable media. Generally, both removable storage 660 and fixed storage 670 are used for bulk storage of information and/or programs. The information and programs stored fixed storage 670 and removable storage 660 are usually copied to RAM 630 for faster access by processor unit 620. Finally, communications device 650 includes network interface cards, modulator/demodulators (modems), and the like, while input output unit (I/O) 680 includes devices such as keyboards, speakers, monitors, and pointing devices.

Although an embodiment of the present invention has been shown and described in detail herein, along with certain variants thereof, many other varied embodiments that incorporate the teachings of the invention may be easily constructed by those skilled in the art. For example, the triggering event used in most of the examples above is the rising edge of a clock signal. It will be appreciated that the same principles discussed with regard to the rising edges of clocks applies as well when the falling edges of clocks, or other suitable signal features, are used as triggering events. Accordingly, the present invention is not intended to be limited to the specific forms set forth herein, but on the contrary, it is intended to cover such alternatives, modifications, and equivalents, as can be reasonably included within the spirit and scope of the invention.

What is claimed is:

1. A method comprising:
   determining an offset between a first clock signal and a second clock signal, the first clock signal having a first frequency related to a reference clock and the second clock signal having a second frequency different from the first frequency and related to the reference clock;
   determining an effective phase shift between the first clock signal and the second clock signal, based on the offset and a greatest common divisor (GCD), the greatest common divisor involving a multiple of the reference clock period by which the periods of both the first clock and the second clock can be divided without a remainder;
   determining an edge difference based on the effective phase shift; and
   adjusting an interval between a reference edge of a first test clock signal and a reference edge of a second test clock signal to simulate a worst case slack.

2. The method of claim 1 wherein the worst case slack is a worst case setup slack.

3. The method of claim 1 wherein the worst case slack is a worst case hold slack.

4. The method of claim 1 wherein determining an edge difference for the worst case slack includes setting the edge difference equal to the effective phase shift.

5. The method of claim 4 wherein setting the edge difference equal to the effective phase shift is performed if the effective phase shift is non-zero.

6. The method of claim 1 wherein determining an effective phase shift includes determining the GCD of the first clock signal and the second clock signal.

7. The method of claim 6 wherein the first clock signal has a period Mx times the period of the reference clock, the second clock signal has a period Mr times the reference clock and determining an effective phase shift includes setting the effective phase shift equal to MOD(Offset, GCD (Mx, Mr)).

8. The method of claim 1 wherein determining an offset includes determining a non-negative offset.

9. A technique for use in static timing analysis of a circuit employing a transmit clock and a receive clock having different frequencies related to a frequency of a common reference clock, the technique to account for a phase difference between the transmit clock and the receive clock, the technique comprising:
   determining an offset between the transmit clock and the receive clock;
   determining an effective phase shift between the transmit clock and the receive clock, based on the offset and a greatest common divisor (GCD), the greatest common divisor involving a multiple of the reference clock period by which the periods of both the first clock and the second clock can be divided without a remainder,
   setting an edge difference equal to the effective phase shift; and
   adjusting an interval between a reference point on a test transmit clock and a reference point on a test receive clock to simulate the worst case slack.

10. The technique of claim 9 wherein the edge difference is set equal to the effective phase shift if the effective phase shift is non-zero.

11. The technique of claim 9 wherein the worst case slack is a worst case setup slack.

12. The technique of claim 9 wherein the worst case slack is a worst case hold slack.

13. The technique of claim 9 wherein the first clock signal has a period Mx times the period of the reference clock, the second clock signal has a period Mr times the reference clock and determining an effective phase shift includes setting the effective phase shift equal to MOD(Offset, GCD (Mx, Mr)).

14. A technique for use in static timing analysis of a circuit employing a transmit clock and a receive clock having different frequencies related to a frequency of a common reference clock, the technique comprising determining a test edge difference corresponding to a worst case slack without enumerating triggering events of the transmit clock and the receive clock, wherein determining a worst case slack includes:

determining an offset between the transmit clock and the receive clock;

determining an effective phase shift between the transmit clock and the receive clock, based on the offset and a greatest common divisor (GCD), the greatest common divisor involving a multiple of the reference clock period by which the periods of both the first clock and the second clock can be divided without a remainder; and setting the test edge difference equal to the effective phase shift.

15. The technique of claim 14 wherein the edge difference is set equal to the effective phase shift if the effective phase shift is non-zero.

16. The technique of claim 14 further comprising adjusting an interval between a reference point on a test transmit clock and a reference point on a test receive clock to simulate the worst case slack.

17. The technique of claim 16 wherein the worst case slack is a worst case setup slack.

18. The technique of claim 16 wherein the worst case slack is a worst case hold slack.

19. The technique of claim 14 wherein determining a test edge difference includes determining the GCD of the transmit clock and the receive clock.

20. The technique of claim 19 wherein the first clock signal has a period Mx times the period of the reference clock, the second clock signal has a period Mr times the reference clock and determining an effective phase shift includes setting the effective phase shift equal to MOD (Offset, GCD(Mx, Mr)).

21. An article of manufacture comprising:

a computer usable storage medium encoding a program of instructions, said program of instructions comprising:

at least one executable instruction to determine an offset between a first clock signal and a second clock signal, the first clock signal having a first frequency related to a reference clock and the second clock signal having a second frequency different from the first frequency and related to the reference clock;

at least one executable instruction to determine an effective phase shift between the first clock signal and the second clock signal, based on the offset and a greatest common divisor (GCD), the greatest common divisor involving a multiple of the reference clock period by which the periods of both the first clock and the second clock can be divided without a remainder;

at least one executable instruction to determine an edge difference based on the effective phase shift; and at least one executable instruction to adjust an interval between a reference edge of a first test clock signal and a reference edge of a second test clock signal to simulate a worst case slack.

22. The article of manufacture of claim 21 wherein the worst case slack is a worst case setup slack.

23. The article of manufacture of claim 21 wherein the worst case slack is a worst case hold slack.

24. The article of manufacture of claim 21 wherein the at least one executable instruction to determine a worst case slack includes at least one executable instruction to set the edge difference equal to the effective phase shift.

25. The article of manufacture of claim 21 wherein the at least one executable instruction to determine a worst case slack includes at least one executable instruction to set the edge difference equal to the effective phase shift if the effective phase shift is non-zero.

26. The article of manufacture of claim 21 wherein the at least one executable instruction to determine an effective phase shift includes the at least one executable instruction to determine the GCD of the first clock signal and the second clock signal.

27. The article of manufacture of claim 26 wherein the first clock signal has a period Mx times the period of the reference clock, the second clock signal has a period Mr times the reference clock and the at least one executable instruction to determine an effective phase shift includes the at least on executable instruction to set the effective phase shift equal to MOD(Offset, GCD(Mx, Mr)).

28. A method performed on a processor that encodes an integrated circuit design on a computer usable storage medium, the method comprising:

determining an offset between a first clock signal and a second clock signal, the first clock signal having a first frequency related to a reference clock and the second clock signal having a second frequency different from the first frequency and related to the reference clock;

determining an effective phase shift between the first clock signal and the second clock signal, based on the offset and a greatest common divisor (GCD), the greatest common divisor involving a multiple of the reference clock period by which the periods of both the first clock and the second clock can be divided without a remainder;

determining an edge difference based on the effective phase shift;

generating a circuit design using the worst case slack; and encoding the circuit design onto the computer usable storage medium.

29. The method claim 28 further including adjusting an interval between a reference edge of a first test clock signal and a reference edge of a second test clock signal to simulate a worst case slack.

30. The method of claim 28 wherein determining an effective phase shift includes determining the GCD of the first clock signal and the second clock signal.

31. The method of claim 30 wherein the first clock signal has a period Mx times the period of the reference clock, the second clock signal has a period Mr times the reference clock and determining an effective phase shift includes setting the effective phase shift equal to MOD(offset, GCD (Mx, Mr)).

32. A system comprising:

means for determining an offset between a first clock signal and a second clock signal, the first clock signal having a first frequency related to a reference clock and the second clock signal having a second frequency different from the first frequency and related to the reference clock;

means for determining an effective phase shift between the first clock signal and the second clock signal, based on the offset and a greatest common divisor (GCD), the greatest common divisor involving a multiple of the reference clock period by which the periods of both the first clock and the second clock can be divided without a remainder;

means for determining an edge difference based on the effective phase shift; and means for adjusting an interval between a reference edge of a first test clock signal and a reference edge of a second test clock signal to simulate a worst case slack.

33. The system of claim 32 wherein the worst the case slack is a worst case setup slack.

34. The system of claim 32 wherein the worst case slack is a worst case hold slack.

35. The system of claim 32 wherein the edge difference determination means includes means for setting the edge difference equal to the effective phase shift.

36. The system of claim 35 wherein the means for setting the edge difference sets the edge difference equal to the effective phase shift if the effective phase shift is non-zero.

37. The system of claim 32 wherein the effective phase shift means includes means for determining the GCD of the first clock signal and the second clock signal.

38. The system of claim 37 wherein the first clock signal has a period Mx times the period of the reference clock, the second clock signal has a period Mr times the reference clock and the effective phase shift means includes means for setting the effective phase shift equal to MOD(Offset, GCD) Mx, Mr)).

39. The system of claim 32 wherein the offset means includes means for determining a non-negative offset.

* * * * *